US011077942B2

(12) United States Patent
Achtelik et al.

(10) Patent No.: US 11,077,942 B2
(45) Date of Patent: Aug. 3, 2021

(54) METHOD AND SYSTEM FOR PROVIDING AN AERIAL DISPLAY

(71) Applicant: Intel Deutschland GmbH, Neubiberg (DE)

(72) Inventors: Michael Achtelik, Stockdorf (DE); Klaus Doth, Krailling (DE); Daniel Gurdan, Germering (DE); Jan Stumpf, Planegg (DE); Tobias Gurdan, Germering (DE); Markus Luetzenburger, Maisach (DE)

(73) Assignee: Intel Deutschland GmbH, Neubiberg (DE)

( * ) Notice: Subject to any disclaimer, the term of this patent is extended or adjusted under 35 U.S.C. 154(b) by 517 days.

(21) Appl. No.: 15/762,804

(22) PCT Filed: Sep. 16, 2016

(86) PCT No.: PCT/EP2016/072002
§ 371 (c)(1),
(2) Date: Oct. 9, 2018

(87) PCT Pub. No.: WO2017/050657
PCT Pub. Date: Mar. 30, 2017

(65) Prior Publication Data
US 2019/0084671 A1    Mar. 21, 2019

(30) Foreign Application Priority Data

Sep. 23, 2015  (DE) ............... 10 2015 116 117.6

(51) Int. Cl.
*B64C 39/02* (2006.01)
*G05D 1/10* (2006.01)

(52) U.S. Cl.
CPC .......... *B64C 39/024* (2013.01); *G05D 1/104* (2013.01); *B64C 2201/027* (2013.01);
(Continued)

(58) Field of Classification Search
None
See application file for complete search history.

(56) References Cited

U.S. PATENT DOCUMENTS

| 6,524,240 B1 | 2/2003 | Thede |
| 8,825,225 B1 | 9/2014 | Stark et al. |

(Continued)

FOREIGN PATENT DOCUMENTS

| DE | 102013004881 A1 | 9/2014 |
| DE | 102013019098 B3 | 1/2015 |

(Continued)

OTHER PUBLICATIONS

Chee Nam Chua, "Integration of Multiple UAVS for Collaborative ISR Missions in an Urban Environment" (Year: 2012).*

(Continued)

*Primary Examiner* — Jonathan M Dager
*Assistant Examiner* — Garrett F Evans
(74) *Attorney, Agent, or Firm* — Viering, Jentschura & Partner mbB (57) ABSTRACT

A method for providing an air display comprising a multiplicity of unmanned aircraft comprising: automatic loading of mission data of a plurality of unmanned aircraft into the data store of an unmanned aircraft via the ground station by means of the first data connection, querying and storing identifiers, GPS data, and the system status from a plurality of the multiplicity of unmanned aircraft by the control unit by means of the first or second data connection, calculating the flight paths for the plurality of unmanned aircraft based on the GPS data and the first target positions of the respective unmanned aircraft by means of the control unit in real time, assigning flight path numbers to a plurality of the unmanned aircraft by the control unit by means of the first or second data connection, and independent and synchro- (Continued)

nized performance of the entire mission by the unmanned aircraft after the launch.

15 Claims, 3 Drawing Sheets

(52) U.S. Cl.
CPC .... *B64C 2201/12* (2013.01); *B64C 2201/143* (2013.01); *B64C 2201/20* (2013.01)

(56) References Cited

U.S. PATENT DOCUMENTS

| | | | |
|---|---|---|---|
| 8,862,285 B2 | 10/2014 | Wong et al. | |
| 9,169,030 B2 | 10/2015 | Wong et al. | |
| 9,524,648 B1* | 12/2016 | Gopalakrishnan | H04K 3/224 |
| 9,678,507 B1* | 6/2017 | Douglas | G08G 5/0069 |
| 10,303,415 B1* | 5/2019 | Ananthanarayanan | G06F 3/1446 |
| 2011/0029804 A1 | 2/2011 | Hadden et al. | |
| 2013/0134254 A1 | 5/2013 | Moore | |
| 2014/0236388 A1 | 8/2014 | Wong et al. | |
| 2014/0249693 A1* | 9/2014 | Stark | B64D 47/02 701/2 |
| 2014/0374535 A1 | 12/2014 | Wong et al. | |
| 2016/0376031 A1* | 12/2016 | Michalski | G05D 1/0669 701/15 |

FOREIGN PATENT DOCUMENTS

| | | |
|---|---|---|
| WO | 2013163746 A1 | 11/2013 |
| WO | 2014160589 A1 | 10/2014 |

OTHER PUBLICATIONS

German Office Action based on Application No. 10 2015 116 117.6, dated Jul. 4, 2016, 8 pages (Reference Purpose Only).
German Office Action based on Application No. 10 2015 116 117.6, dated May 16, 2017, 6 pages (Reference Purpose Only).
International Search Report based on Application No. PCT/EP2016/072002, dated Feb. 17, 2017, 9 pages (Reference Purpose Only).

\* cited by examiner

METHOD AND SYSTEM FOR PROVIDING AN AERIAL DISPLAY

TECHNICAL SUBJECT AREA

The invention relates to a method and a system for providing an aerial display, including a multiplicity of unmanned aircraft, each having a light means, a data store and an identifier, at least one base station which is designed to communicate with the multiplicity of aircraft via a first data connection, and at least one control unit for mission control and controlling the fleet.

PRIOR ART

One way in which unmanned aircraft can be used is in display teams or fleets. Such fleets are increasingly commonly used for research and airshow purposes, for example as light display elements. Such a use is known, for example, from U.S. Pat. No. 8,862,285 B2.

Unmanned aircraft tend to have a controller (auto-pilot), a data interface, a data store for mission parameters and flight paths, a position and altitude control and a rechargeable battery as a power supply. At present, for use in a fleet each unmanned aircraft must be separately supplied with the individually designed flight data for the particular unmanned aircraft. Such a system is described, for example, in US 2014/0249693 A1.

The data can be loaded into the memory of each individual unmanned aircraft manually, by plugging in a cable connection on the ground, by manually attaching a data storage medium (for example an SD memory card) or else via a wireless connection during the operation. In addition, a rechargeable battery that provides the power supply must be charged separately. The battery is charged via the manual replacement of the battery, and this can be taken to a charging station outside of the aircraft. Alternatively, the unmanned aircraft can be manually plugged into a charging device directly, if it is not possible to remove the battery.

In addition, each unmanned aircraft must be permanently connected to a mission and fleet control, usually by means of a PC and a control software, which form and ensure the control and monitoring of the individual unmanned aircraft within the fleet. For this purpose, data must be continuously exchanged between each unmanned aircraft in the fleet and the mission and fleet control. Such a data exchange is also relevant to the detection of status conditions and malfunctions of individual or multiple unmanned aircraft in the fleet.

As a result of this task, the mission and fleet control is also safety-relevant. A data exchange can also take place by means of a network in the fleet, by for example the mission and fleet control only maintaining the connection to the spatially nearest unmanned aircraft. This unmanned aircraft then communicates with other participating unmanned aircraft in the fleet in turn.

One consequence of this is that above a certain number n of unmanned aircraft in the fleet, a wireless data communication between the unmanned aircraft and the mission and fleet control or among each other is no longer possible, since the ISM frequency bands for Short Range Devices (SRD) that are available for this purpose and the resulting usable bandwidths for the data communication represent a limit on the maximum number of unmanned aircraft that can be used in the fleet.

A fail-safe wireless connection to individual or a plurality of unmanned aircraft can no longer be ensured. In addition, the manual workload for activities such as data exchange via cable interface, attaching a storage medium, maintenance, system monitoring and battery exchange increases with the number of unmanned aircraft in the fleet to such an extent that here also, the necessary deployment of personnel represents the economically viable limit and with it the number of unmanned aircraft in the fleet. A high manual workload also poses a high safety risk due to a high level of possible error sources.

According to the current state of the art, an arbitrary installation and positioning of the unmanned aircraft in a starting configuration on the ground is not possible without a complete recalculation of all flight paths of all unmanned aircraft involved in the mission, because the position on the ground already represents the first position in the animation, and all the other positions and flight paths to them depend on this.

DESCRIPTION OF THE INVENTION

On the basis of the known prior art an object of the present invention is to specify an improved method and an improved system for deploying an air display.

This object is achieved by means of a method having the features of claim 1.

Advantageous embodiments are obtained from the dependent claims.

Accordingly, a method for providing an air display is specified, including a multiplicity of unmanned aircraft, each including a lighting means, a data store and an identifier, at least one base station which is designed to communicate with the multiplicity of aircraft via a first data connection, and at least one control unit for mission control and control of the fleet, wherein the control unit is connected to the ground station for indirect communication with the multiplicity of unmanned aircraft, and wherein the control unit can communicate directly with the multiplicity of unmanned aircraft via a second data connection, said method including the following steps: automatic loading of the mission data from a plurality of unmanned aircraft into the data store of an unmanned aircraft via the ground station by means of the first data connection, requesting and storing the identifier, GPS data and the system status from a plurality of the multiplicity of unmanned aircraft by the control unit by means of the first or the second data connection, calculating the flight paths for the plurality of unmanned aircraft based on the GPS data and the first target positions of the respective unmanned aircraft by means of the control unit in real time, assigning flight path numbers to a plurality of the unmanned aircraft by the control unit by means of the first or the second data connection, and independent and synchronized performance of the entire mission by the unmanned aircraft after the launch.

To provide the mission control, the control unit provides a fixedly defined user front-end interface, via which the application-specific data, tasks and mission parameters can be created. The control of the fleet is integrated in the backend of the server and controls all the basic functions of the fleet, in other words the plurality of unmanned aircraft. This includes functions such as the take-off and landing sequences, positioning, flight path and collision monitoring.

The fact that each aircraft of the multiplicity of unmanned aircraft is assigned an identifier means that it is possible to unambiguously identify each individual unmanned aircraft.

The multiplicity of unmanned aircraft includes all unmanned aircraft n, which are deployed to provide the air display. The plurality of unmanned aircraft m is the number of the unmanned aircraft which actually take part in the mission of an air display, that is to say, the unmanned aircraft to which a flight path is assigned.

Due to the fact that the control unit can communicate indirectly with the multiplicity of unmanned aircraft by means of the first data connection between the base station and the multiplicity of unmanned aircraft, the load on the second data connection for direct communication of the control unit with the multiplicity of unmanned aircraft can be reduced. If the second data connection is, for example, a radio link, the capacity of which is limited by a defined bandwidth, it is possible to reduce the traffic on the second data connection by means of the first data connection. Thus, for example, a design is possible according to which the second data connection is only invoked for direct communication between the control unit and the multiplicity of unmanned aircraft when absolutely necessary.

The fact that the mission data of the plurality of unmanned aircraft are loaded in the respective data store of an unmanned aircraft means it is possible for the control unit to assign each unmanned aircraft to any desired flight path. In other words, every unmanned aircraft holds all flight paths—including those of the other unmanned aircraft—in its data store, and via the assignment of a flight path number and also, for example, a time stamp, can be assigned to a specific flight path which it covers during the mission, that is to say, during the air display. Accordingly, it is not necessary for the plurality of unmanned aircraft to be controlled by means of a continuous data connection during the air display. This leads to a significant reduction in the load on the second data connection between the set of unmanned aircraft and the control unit.

It is possible therefore, even during an ongoing mission, to assign individual unmanned aircraft to new flight paths dynamically and at any time. If, for example, one unmanned aircraft fails, the flight path number of the defective unmanned aircraft can be assigned to another operational aircraft, so that the operational unmanned aircraft adopts the flight path of the defective unmanned aircraft. The corresponding unmanned aircraft are then identified on the basis of their identifier and each one simply receives a new trigger data package from the control unit containing the flight path number and time specification.

As the newly selected operational unmanned aircraft has all flight paths stored in its memory, it knows its newly assigned flight path, so that any control by the control unit for traversing this flight path by means of the second data connection is redundant.

Due to the querying and storage of the identifiers, GPS data and the system status of the plurality of the multiplicity of unmanned aircraft, the control unit receives the actual position of any of the unmanned aircraft as well as information about whether an unmanned aircraft is operational.

Based on this information, the control unit calculates for each unmanned aircraft participating in the air display the launch time and optimal flight path to the first position in the air display. This process takes into account aspects such as the length of the flight route to the target position, that is, the first position of the air display, and collision avoidance.

Based on this dynamic real-time calculation, the control unit assigns each unmanned aircraft a flight path number and a launch time before the launch. Thus it is not necessary to arrange the unmanned aircraft in a defined starting formation in advance. Therefore, the arrangement of the unmanned aircraft before the launch is not subject to any system, so that the formation can be implemented freely according to the local conditions. This minimizes the effort required for preparing the deployment of an air display, which has a particularly advantageous effect on air displays with a large number of unmanned aircraft.

After the launch, each unmanned aircraft carries out the entire mission autonomously and in a synchronized manner. During the mission, only system status data of the individual unmanned aircraft are sent to the control unit at defined time intervals. Continuous data traffic is thus no longer necessary to control the plurality of unmanned aircraft. This allows the utilization of the available bandwidth in a corresponding band, such as an ISM band, to be reduced. And as a result, the number of unmanned aircraft that are involved in an air display can be significantly increased.

In a preferred design the control unit assigns a launch time to each unmanned aircraft before the launch. This serves to ensure that the individual unmanned aircraft assume their first position of the air display on time. In addition, the allocation of launch times means that the unmanned units can be prevented from colliding with each other on the way to the first position in the air display. The allocation of different launch times allows, for example, the possibility that unmanned aircraft which are further away from their first position of the air display can receive an earlier launch time than unmanned aircraft that are closer to their first position of the air display.

In a preferred embodiment an unmanned aircraft of the multiplicity of unmanned aircraft and the control unit communicate via the first data connection when the unmanned aircraft is in physical contact with the ground station, and an unmanned aircraft of the multiplicity of unmanned aircraft and the control unit communicate via the second data connection when the unmanned aircraft is separated from the ground station. Due to the physical contact of the multiplicity of unmanned aircraft with at least one ground station, the first data connection, which in particular is used to load mission data onto the multiplicity of unmanned aircraft and for retrieving the identifier, GPS data and the system status of the multiplicity of unmanned aircraft, is not restricted to the bandwidth of a wireless connection. By means of a first data connection in the form of, for example, a high-speed optical interface or a serial interface in the form of contacts, it is therefore possible to prepare a significantly greater number of unmanned aircraft for an air display.

In a further extension, during the mission system status data are sent from the different unmanned aircraft at defined time intervals via the second data connection to the control unit. This means that it is possible, for example, to identify defective unmanned aircraft or unmanned aircraft that deviate from their respective defined flight path. Overall, this enables the progress of the mission to be monitored.

In a further preferred embodiment, by means of the second data connection trigger signals for the synchronization of the air display with other elements are sent to the plurality of unmanned aircraft after the launch. These other elements can be optical and/or acoustic show effects. It is thus possible, for example, to synchronize the air display with fireworks or light beams. Accordingly, the unmanned aircraft can be stimulated by means of the trigger signals to adopt a new flight path and/or to readopt their originally defined flight path. It is thus possible, for example, using the trigger signals to give the unmanned aircraft the command to pause, which means to remain in their current position in the air space or to terminate the air display and, for example, fly back to a landing zone.

In a further preferred extension, during physical contact between an unmanned aircraft and the ground station a rechargeable battery of the unmanned aircraft is charged. Accordingly, the ground station assumes the function of a docking station, which makes the additional process of connecting to an unmanned aircraft for charging purposes redundant. The ground station is then able, by simply arranging an unmanned aircraft on the ground station, to implement a charging process, wherein the rechargeable battery of the unmanned aircraft can be charged directly or inductively. Overall, this allows the effort required to prepare an air display to be reduced.

In a further preferred design, the first data connection between the ground station and the respective unmanned aircraft is disconnected by lifting the unmanned aircraft. Accordingly, the first data connection requires a physical contact between the unmanned aircraft and the ground station.

In a further preferred embodiment, a landing of an unmanned aircraft of the plurality of unmanned aircraft can be carried out by specifying a descent rate and a GPS target coordinate by means of the control device. It is therefore not necessary for the control unit to steer the plurality of unmanned aircraft from the last position of the air display to the target coordinate of the landing position. Since at the end of the mission the second data connection is only utilized for specifying the descent rate and the GPS target coordinate for each individual unmanned aircraft, it is possible to coordinate a significantly larger number of unmanned aircraft, even at the end of a mission. In other words, for landing the control unit specifies only the how and the where to an unmanned aircraft. The landing itself, in other words the landing section of the flight, can then be effected by each device independently without having to continuously maintain the second data connection, because the flight path is already contained in the data store of the unmanned aircraft.

The object referred to above is also solved by means of a system having the features of Claim 9. Advantageous embodiments are obtained from the dependent claims.

Accordingly, a system for providing an air display is specified, including a multiplicity of unmanned aircraft, each including a lighting means, a data store and an identifier, at least one control unit for mission control and controlling the fleet, and at least one base station which can provide at least one data connection between an unmanned aircraft and the control unit, wherein each unmanned aircraft provides the data of at least a plurality of the multiplicity of unmanned aircraft in the data store of the unmanned aircraft.

The multiplicity of unmanned aircraft includes all the unmanned aircraft n that are deployed to provide the air display. The plurality of unmanned aircraft m is the number of the unmanned aircraft that actually take part in the mission of an air display, that is to say, the unmanned aircraft to which a flight path is assigned.

The fact that every unmanned aircraft has the data of the plurality of the unmanned aircraft participating in the mission in the memory means that it is sufficient to assign a flight path number to an unmanned aircraft. The unmanned aircraft can then select, by using the flight number assigned to it, the flight path provided in its memory and fly along it during the air display. It is therefore not necessary for the plurality of unmanned aircraft to be controlled by means of a continuous data connection during the air display. This leads to a significant reduction of the load on the data connection between the set of unmanned aircraft and the control unit. If the data connection between an unmanned aircraft and the control unit is, for example, a radio link, the capacity of which is limited by a predefined bandwidth, then this enables the bandwidth utilization to be reduced, resulting in a significantly larger number of unmanned aircraft being able to take part in an air display.

In a preferred design the data from the unmanned aircraft include the mission data and flight path numbers. The mission data include keyframes, time stamps, pixel numbers and the identification of the individual unmanned aircraft. A keyframe represents a complete picture of the air display, which is composed of a plurality of pixels. The time or the time stamp specify when an unmanned aircraft has to be at the respective pixel number.

Therefore, each unmanned aircraft has all the relevant information to perform or to fly through the entire mission of an air display after assignment of a flight path number.

In a preferred embodiment the unmanned aircraft have rechargeable batteries, which can be charged by physical contact of the unmanned aircraft with the ground station. Accordingly, in order to charge the batteries of the unmanned aircraft, it is sufficient merely to bring this into contact with the ground station. The ground station can be designed accordingly to favor a relative positioning of the unmanned aircraft to the ground station, which enables the battery to be charged. The provision of a physical contact between an unmanned aircraft and the ground station, that is to say, the placement of an unmanned aircraft on the ground station, involves less effort than connecting a charging cable to an unmanned aircraft for charging purposes. Accordingly, the manual effort required to charge the unmanned aircraft can be reduced, so that a larger number of unmanned aircraft can be deployed for an air display.

In an extension, a first data connection can be provided upon physical contact between an unmanned aircraft of the multiplicity of unmanned aircraft and the ground station. Accordingly, an unmanned aircraft has a contact, which can be brought into contact with a contact on the ground station, thus providing the first data connection. In this way, data can be read from an unmanned aircraft and forwarded via the ground station to the control unit for evaluation. Conversely, data, for example mission data and/or flight path numbers and the like, can be loaded from the control unit into the data store of the unmanned aircraft via the ground station.

In a further preferred embodiment, a first data connection can be provided by means of an optical connection between the multiplicity of unmanned aircraft and the ground station. As a result, it is sufficient to position an optical data connection element on the unmanned aircraft relative to an optical data connection element of the ground station, so that an optical connection can be provided between these data connection elements. Such an optical data connection is less susceptible to wear. Furthermore, an optical connection reduces the design complexity of an unmanned aircraft and the ground station, since the need to provide a point of contact between the unmanned aircraft and the ground station is eliminated.

In a further preferred extension, an unmanned aircraft of the multiplicity of unmanned aircraft is aerodynamically designed in such a way that a maximum impact energy of 60 J cannot be exceeded. As a result it is possible to also use the system for providing an air display in urban areas, because an impact energy of Joule is still within the range of non-critical potential injuries due to a crashed unmanned aircraft. In this way, the unmanned aircraft can have, for example, a propeller protector in order to counteract potential injuries due to the unmanned aircraft crashing to the ground. In addition, relatively soft materials can be used for the components of the unmanned aircraft. In addition, the unmanned aircraft can be designed in such a way that it is stabilized in free-fall, and in addition, it has an air resistance which is as high as possible.

BRIEF DESCRIPTION OF THE DRAWINGS

Further preferred embodiments and aspects of the present invention will be explained in more detail in the following description of the figures. These show.

DETAILED DESCRIPTION OF PREFERRED EMBODIMENTS

In the following, preferred embodiments are described by reference to the figures. In these, identical, similar or functionally equivalent elements are designated with identical reference numerals. In order to avoid redundancy, a repeated description of these elements will not be given in all cases in the following description.

Figure 1:
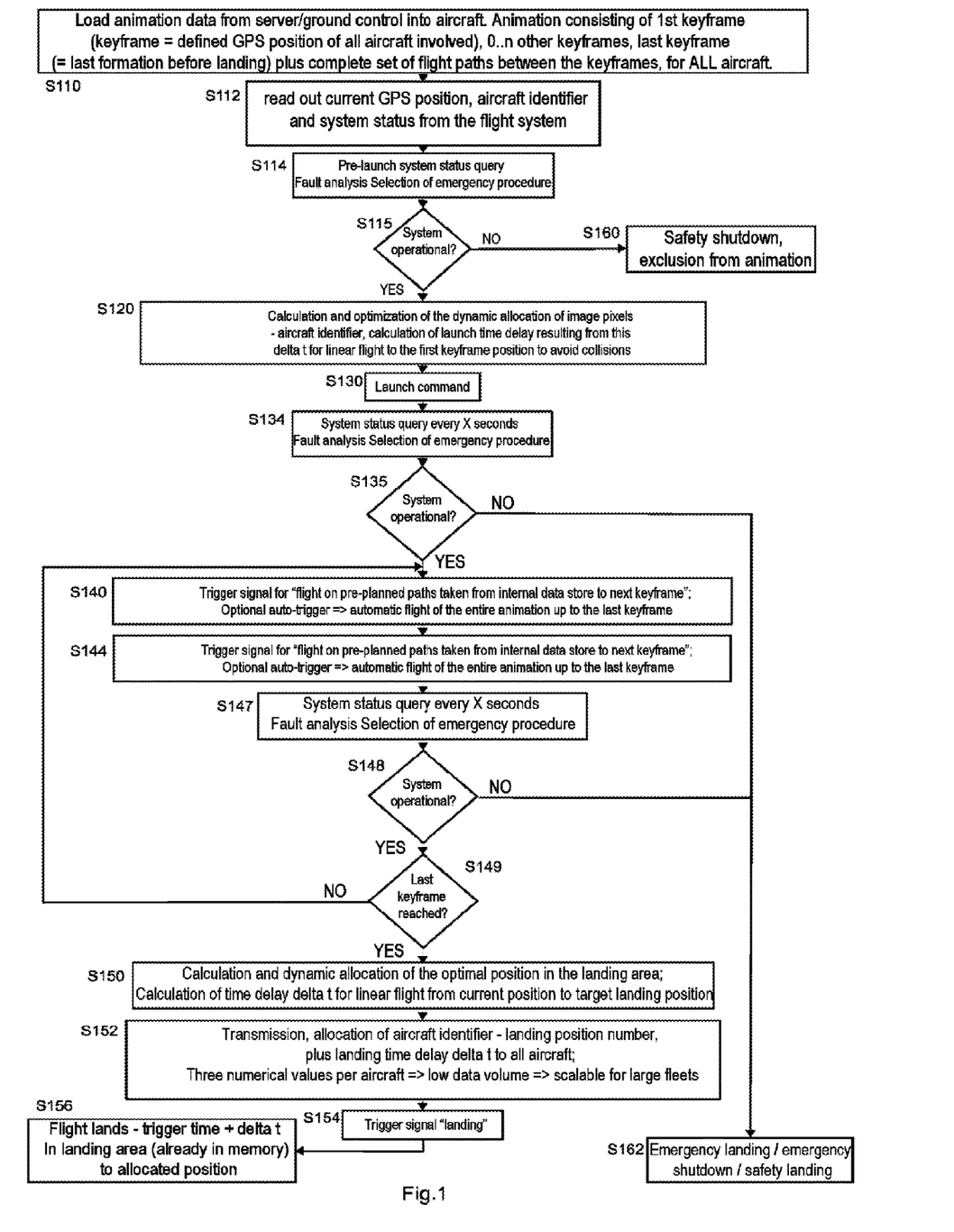
FIG. 1 a block diagram, which shows a schematic illustration of the method for providing an air display, FIG. 2 a schematic illustration of the data connections between the control unit and the unmanned aircraft, and FIG. 3 a schematic illustration of a ground station with unmanned aircraft.

Step S-110 of the method shown in FIG. 1 for providing an air display includes the loading of animation data from a control unit into the respective unmanned aircraft. In this case the control unit is a ground control in the form of a server. Alternatively, the control unit can also be implemented by means of a laptop, PC or similar device. The animation, in other words the air display described by the animation data, includes all keyframes required for the animation as well as all flight paths between the individual keyframes for all unmanned aircraft. Each individual keyframe is defined by the GPS locations of the unmanned aircraft participating in the animation. The first keyframe forms the initial formation of the unmanned aircraft after the launch of the display. The final keyframe of the animation forms the formation of the unmanned aircraft before the landing.

The loading of the animation data onto the unmanned aircraft is carried out from the server via a ground station into a data store of every unmanned aircraft.

In step S-112 the current GPS position and the aircraft identifier are read out of an unmanned aircraft by the server. Then, in step S-114 the system status of an unmanned aircraft is requested from the server. Depending on the system status of an aircraft before the launch, at step S-115 the server decides whether or not the respective aircraft is ready for operation. In the event that the corresponding aircraft is not ready for operation, the server performs a fault analysis with respect to the flight system of the corresponding aircraft and excludes, as shown in step S-160, the unmanned aircraft from the forthcoming animation by performing a safety shutdown of the affected unmanned aircraft. The safety shutdown is thus performed at a time when the unmanned aircraft is not yet airborne.

Typically, there are more aircraft available than are needed for an animation, so that in the event that an aircraft is excluded from the animation, as shown in step S-160, recourse can be made to a set of reserve aircraft.

If on the other hand the server classifies the aircraft as ready for operation, in step S-120 it starts to allocate pixel numbers to the respective aircraft identifiers. The pixel numbers are allocated dynamically, which means that the server calculates the optimal launching point for each aircraft participating in the animation, which is to say, the most suitable first pixel of the animation. In doing so the server takes into account the respective current GPS position of an aircraft and determines the shortest possible flight path of the individual aircraft to their first keyframe positions, avoiding collisions between the aircraft. The result of this calculation leads, among other things, to launch times of the individual aircraft that are delayed relative to each other, which enables a linear flight of an aircraft from its original GPS position to the first keyframe position allocated by the server. Accordingly, the aircraft do not have to avoid one another and can take the shortest path to their first keyframe position.

After the flight paths of the current GPS positions of the aircraft to their respective first keyframe position have been calculated, the launch command is issued in step S-130. For example, a command can be issued to an unmanned aircraft which causes it to fly on a linear flight path, at a time which is offset by δt from a general launch time, to a predetermined position of a pixel of the first keyframe.

In step S-134 a new system status query is made. This can be performed, for example, at fixed time intervals during the animation. Alternatively, a query of the system status can always be made after a new keyframe position is adopted.

If the server deems the system of an aircraft not to be in proper order, it performs a fault analysis and engages one of the emergency procedures listed in step S-162. The emergency procedures listed under step S-162 include an emergency landing, an emergency shutdown and a safety landing. An emergency landing here involves executing an unscheduled landing of the affected aircraft. For this purpose, the affected aircraft receives a predefined descent rate from the server in order to perform an emergency landing at the current GPS position of the unmanned aircraft. In the event of an emergency shutdown, the aircraft, in particular its propeller, is switched off immediately, in other words while still in flight. This causes the aircraft to fall to the ground. An emergency shutdown of an aircraft may be necessary, for example, if a foreign object has become caught in the propellers of the aircraft, for example, hairs belonging to a spectator.

In the event of a safety landing the server arranges for the aircraft to land according to a predetermined sink rate and predetermined GPS target coordinates. This may take place, for example, upon an input command by a user, or other criteria specified by the server, such as a critical wind strength being exceeded. For the safety landing a separate safety landing area can be provided, the coordinates of which are already contained in the data store of the unmanned aircraft.

If the server deems the system status to be in order at the time of the system status query under step S-134, it outputs a trigger signal in step S-140, whereupon the aircraft travels to the next keyframe position along the predetermined flight path which is located in the data store of the aircraft.

In step S-144 a trigger signal is re-issued by the server, whereupon the aircraft sets out on the predetermined flight path to the next keyframe position.

After the server has issued two trigger signals for traversing the flight path by the aircraft, this is followed in step S-147 by a fresh query of the system status. At step S-148 the server orders one of the emergency procedures listed under step S-162, if the system status of the unmanned aircraft is not in order.

If the system status of the unmanned aircraft is in order the server determines in step S-140 whether the respective aircraft has reached the last keyframe. If this is not the case, the steps S-140 and S-144 will be carried out again. If the server determines at step S-149 that the respective aircraft has reached the last keyframe position, the process continues with step S-150.

FIG. 1 shows, in steps S-140 and S-144, an alternative to the server-triggered, step-by-step traversal of the flight paths. Accordingly in steps S-140 and S-144 an auto-trigger is optionally specified, following which the aircraft automatically fly through the complete animation up to the final keyframe position. If the aircraft have flown the entire animation using the auto-trigger variant, the server detects at step S-149 that the last keyframe has been reached. As in the step-by-step server-triggered variant, the process continues with step S-150.

In step S-150 the server has already determined that the last keyframe has been reached. This means that all the aircraft are located at their final keyframe positions of the animation. The aircraft initially remain at this position. In step S-150 the server performs a dynamic real-time calculation to determine the coordinates of a landing position for each aircraft. So that the aircraft describe a linear flight path from their last keyframe position to the landing position, in other words to the target position, the server calculates a time delay δt on which the triggering of the aircraft is based, so that they describe the descent to their landing position. A complex calculation of evasive maneuvers of the individual aircraft among themselves is therefore redundant.

At step S-152, the server allocates to each aircraft identifier, in other words to each unmanned aircraft which is located at the final keyframe position, a landing position number and the calculated time delay δt. Overall, only three numerical values therefore need to be transmitted per aircraft. This results in a comparatively low volume of data to perform the coordination or triggering of the landing of the unmanned aircraft taking part in the animation. Accordingly, the present method is particularly suitable for scaling of large display fleets, which means air displays with a large number of unmanned aircraft.

Alternatively, the server can assign a descent rate to each aircraft, according to which the aircraft travel from their last keyframe position to their predetermined landing position. By using different descent rates of the individual aircraft, as already achieved by the time delay δt, a linear flight path can be provided for landing all the aircraft, without them colliding.

At step S-154 the server issues the trigger signal to the aircraft for landing. The aircraft commence the landing approach at step S-156, wherein the start of the landing approach is based on the trigger time and the time delay δt. The aircraft moves to the landing position assigned to it. Alternatively, the aircraft travels along the flight path specified in the data store to the landing position, taking into account the calculated descent rate. After the successful landing of all aircraft taking part in the animation at their landing positions the mission is terminated.

Figure 2:
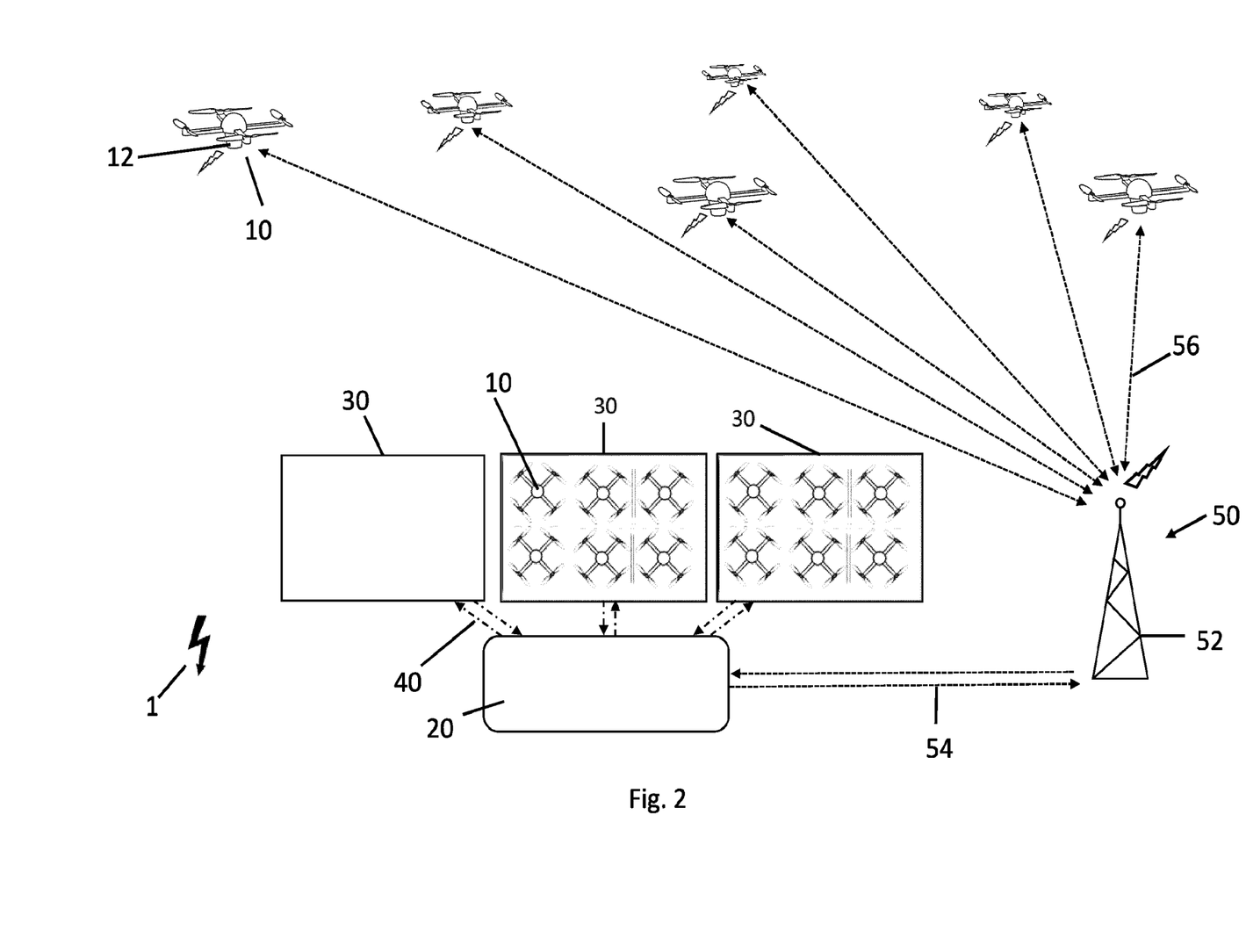

FIG. 2 shows a schematic diagram of a system 1 for providing an air display, in other words an animation. The system 1 includes unmanned aircraft 10, which include a lighting means 12, by means of which the unmanned aircraft can perform an air display. The system 1 also includes ground stations 30, which act as the launch and/or landing platform, transportation device, charging station and interface for data exchange for the unmanned aircraft 10. The system 1 shown in FIG. 2 includes three ground stations 30. Alternatively, depending on the number of unmanned aircraft 10 any number of ground stations 30 can be provided. The ground stations 30 shown in FIG. 2 can each accommodate six unmanned aircraft 10. Alternatively, the ground stations 30 can also be designed in such a way that they can accommodate more than or fewer than six unmanned aircraft 10. Thus, ground stations for accommodating one or a maximum of two unmanned aircraft 10 are also possible, for example, if these are particularly large unmanned aircraft. Alternatively, ground stations 30 are also possible which can accommodate 10, 20 or more unmanned aircraft 10. Such ground stations are suitable, for example, in the case of particularly small unmanned aircraft.

In the situation shown in FIG. 2, six unmanned aircraft are taking part in an air display, that is to say, they are airborne. 12 further unmanned aircraft 10, on the other hand, are located on the ground, distributed over two ground stations 30. The unmanned aircraft 10 which are not taking part in the air display can be used as reserves and are used, for example when one of the unmanned aircraft 10 participating in the air display fails. While the unmanned aircraft 10 are located at the ground station 30, that is to say, are in physical contact with the ground station 30, the rechargeable batteries of the unmanned aircraft 10 can be charged.

The system 1 also includes a control unit 20 in the form of a server. The control unit 20 can communicate via a first data connection 40 with the unmanned aircraft 10 located on the base stations 30. In this scenario the control unit 20 loads the mission data for all flight paths into the data store of every unmanned aircraft associated with a ground station 30. In addition, the control unit 20 can query the identifiers, GPS data and the system status of the unmanned aircraft 10 located on a ground station 30.

If the unmanned aircraft 10 become separated from the ground station 30, which is the case, for example, at the time of launch of an unmanned aircraft 10, the first data connection 40 between the unmanned aircraft and the control unit 20 is disconnected. The unmanned aircraft 10 in the air can communicate with the control unit 20 via a second data connection 50.

The second data connection 50 has an antenna 52, which is connected to the control unit 20 via a data line 54. A wireless connection 56 can be set up between the antenna 52 and the unmanned aircraft 10 currently in the air.

Since the unmanned aircraft in the air 10 also carry all the mission data already, in particular all flight paths, in their respective data stores, it is not necessary to provide a permanent wireless connection 56 to control the unmanned aircraft 10 in the air. Accordingly, the second data connection 50 is only needed for sending system status data from the unmanned aircraft 10 to the control unit and for sending trigger signals, for example for the synchronization of the air display, from the control unit 20 to the unmanned aircraft 10 located in the air. Due to the resulting low utilization of the second data connection 50, it is possible to perform air displays with a large number of unmanned aircraft 10.

Figure 3:
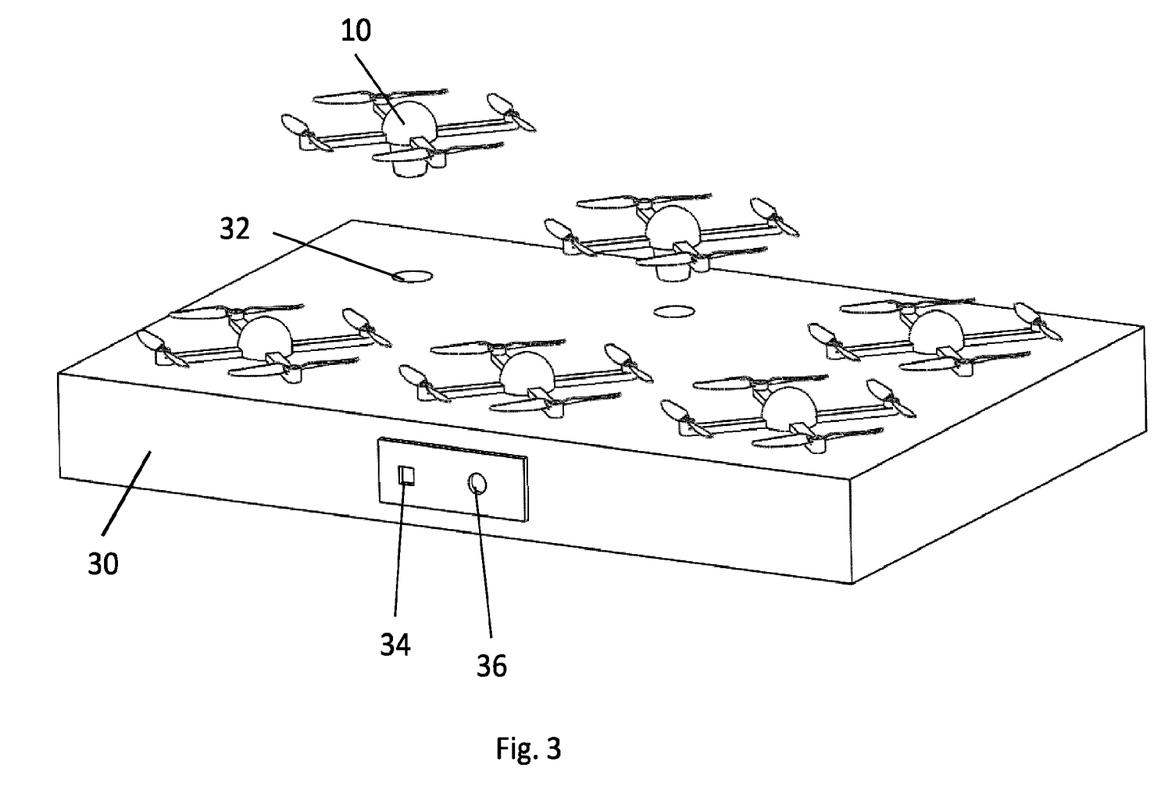

FIG. 3 shows a ground station 30 on which a plurality of unmanned aircraft 10 are arranged. Two unmanned aircraft 10 are already located in the air just above the ground station 30.

The ground station 30 has receptacles 32, which are complementary in shape to the base of the unmanned aircraft 10, in order to accommodate the unmanned aircraft 10 in a defined position on the base station. The positioning, which an unmanned aircraft 10 experiences due to the receptacle 32 on the ground station 30, enables a charging contact and the first data connection between the ground station 30 and the unmanned aircraft 10 to be provided.

The ground station 30 also includes a connection 34 for providing the first data connection between a control unit and the ground station 30. In addition, the ground station 30 includes a power connection 36, which supplies corresponding charging contacts in the receptacles 32 with current.

If applicable, all individual features shown in the various embodiments can be combined and/or interchanged without departing from the scope of the invention.

LIST OF REFERENCE NUMERALS

S-110
to
S-162 steps of a method for providing an animation
1 system
12 unmanned aircraft
12 lighting means
20 control unit
30 ground station
32 receptacle
34 connection
36 power connection
40 first data connection
50 second data connection
52 antenna
54 data line
56 wireless connection

The invention claimed is:

1. A system configured to provide an air display, the system comprising:
a plurality of unmanned aircraft, each unmanned aircraft of the plurality of unmanned aircraft comprises a lighting source, a data store, and an identifier,
a ground station configured to communicate with the plurality of unmanned aircraft via a first data connection, and
a control unit configured to perform mission control and fleet control, wherein:
the control unit is communicatively coupled to the ground station and is configured to indirectly communicate with the plurality of unmanned aircraft via the ground station and the first data connection,
the control unit is configured to communicate directly with the plurality of unmanned aircraft via a second data connection,
the ground station is configured to automatically load, via the first data connection, mission data comprising a plurality of flight path numbers and a plurality of keyframe positions corresponding to a portion of the plurality of unmanned aircraft into the data store of each unmanned aircraft of the plurality of unmanned aircraft, each flight path number and keyframe position of the mission data corresponding to a different unmanned aircraft of the portion of the plurality of unmanned aircraft,
the control unit is configured to query and store the identifiers, GPS data, and a status of the portion of the plurality of unmanned aircraft,
the control unit is configured to calculate flight paths for each unmanned aircraft of the portion of the plurality of unmanned aircraft based on the GPS data and a first target position of each unmanned aircraft of the portion of the plurality of unmanned aircraft,
the control unit is configured to assign flight path numbers to each unmanned aircraft of the portion of the plurality of the unmanned aircraft, and
each unmanned aircraft of the portion of the plurality of unmanned aircraft are configured to perform independent and synchronized performance of a mission after launch based on a corresponding assigned flight path number and the mission data.

2. The system of claim 1, wherein the control unit is configured to assign a launch time to each unmanned aircraft of the portion of the plurality of unmanned aircraft before the launch.

3. The system of claim 1, wherein an unmanned aircraft of the plurality of unmanned aircraft and the control unit communicate via the first data connection when the unmanned aircraft is in physical contact with the ground station and each unmanned aircraft of the plurality of unmanned aircraft and the control unit communicate via the second data connection when the unmanned aircraft is separated from the ground station.

4. The system of claim 1, wherein the plurality of unmanned aircraft is configured to send status data to the control unit via the second data connection at defined time intervals.

5. The system of claim 1, wherein the control unit is configured to provide trigger signals for the synchronization of the air display with other elements to the portion of the plurality of unmanned aircraft after launch.

6. The system of claim 1, wherein during physical contact between an unmanned aircraft of the plurality of unmanned aircraft and the ground station, the ground station is configured to charge a rechargeable battery of the unmanned aircraft.

7. The system of claim 1, wherein the first data connection between the ground station and an unmanned aircraft of the plurality of unmanned aircraft is disconnected by lifting the unmanned aircraft.

8. The system of claim 1, wherein the control unit is configured to specify a descent rate and a GPS target coordinate to cause a landing of an unmanned aircraft of the plurality of unmanned aircraft.

9. A system for providing an air display, comprising:
a plurality of unmanned aircraft, each unmanned aircraft of the plurality of unmanned aircraft comprises a lighting source, a data store, and an identifier,
a control unit configured to perform mission control and fleet control, and
a base station configured to provide a data connection between the plurality of unmanned aircraft and the control unit, wherein:
the ground station is configured to automatically load, via the data connection, data comprising a plurality of flight path numbers and a plurality of keyframe positions corresponding to a portion of the plurality of unmanned aircraft into the data stores of each unmanned aircraft of the plurality of unmanned aircraft, each flight path number and keyframe position of the mission data corresponding to a different unmanned aircraft of the portion of the plurality of unmanned aircraft,
each unmanned aircraft of the plurality of unmanned aircraft stores the plurality of flight path numbers and the plurality of keyframe positions corresponding to the portion of the plurality of unmanned aircraft in the data store of the corresponding unmanned aircraft, and
each unmanned aircraft of the portion of the plurality of unmanned aircraft is configured to perform independent and synchronized performance of a mission after launch based on a corresponding assigned flight path number and the plurality of flight path numbers and the plurality of keyframe positions corresponding to the portion of the plurality of unmanned aircraft.

10. The system of claim 9, wherein the plurality of flight path numbers and the plurality of keyframe positions corresponding to the portion of the plurality of the unmanned aircraft comprises mission data.

11. The system of claim 9, wherein each unmanned aircraft of the plurality of unmanned aircraft comprises a rechargeable battery charged by physical contact of the corresponding unmanned aircraft with the ground station.

12. The system of claim 9, wherein a first data connection is configured to be provided upon physical contact between an unmanned aircraft of the plurality of unmanned aircraft and the ground station.

13. The system of claim 9, wherein a first data connection is provided by means of an optical connection between the plurality of unmanned aircraft and the ground station.

14. The system of claim 9, wherein the control unit is configured to:
  determine, during the mission, an unmanned aircraft of the portion of the plurality of unmanned aircraft is a defective unmanned aircraft,
  determine the identifier of the defective unmanned aircraft, and
  assign a flight path number to another unmanned aircraft of the plurality of unmanned aircraft based on the identifier of the defective unmanned aircraft, wherein the another unmanned aircraft of the plurality of unmanned aircraft is configured to adopt the flight path of the defective unmanned aircraft during the mission.

15. The system of claim 9, wherein the control unit is configured to calculate for and assign to each unmanned aircraft of the portion of the plurality of unmanned aircraft a launch time and an optimal flight path to a corresponding keystone frame position, wherein the launch times and the optimal flight paths are based on GPS data indicating a current position of each unmanned aircraft of the portion of the plurality of unmanned aircraft such that unmanned aircraft of the portion of the plurality of unmanned aircraft that are further away from corresponding keystone frame positions are assigned earlier launch times than unmanned aircraft of the portion of the plurality of unmanned aircraft that are closer to corresponding keystone frame positions.

* * * * *